United States Patent [19]

Flanagin et al.

[11] Patent Number: 4,674,082

[45] Date of Patent: Jun. 16, 1987

[54] PBX TELEPHONE SYSTEM I/O INTERFACE

[75] Inventors: Stephen D. Flanagin, Santa Monica; Howard G. Bubb, Woodland Hills; John R. Scantlin, Los Angeles, all of Calif.

[73] Assignee: Telex Computer Products, Inc., Tulsa, Okla.

[21] Appl. No.: 926,815

[22] Filed: Oct. 31, 1986

Related U.S. Application Data

[63] Continuation of Ser. No. 815,769, Jan. 3, 1986, abandoned, which is a continuation of Ser. No. 738,536, May 24, 1985, abandoned, which is a continuation of Ser. No. 432,882, Oct. 5, 1982, abandoned.

[51] Int. Cl.[4] .............................................. H04J 3/24
[52] U.S. Cl. ....................................... 370/60; 370/94
[58] Field of Search ...................... 370/94, 60, 58, 85, 370/68, 67; 340/825.5

[56] References Cited

U.S. PATENT DOCUMENTS

| | | |
|---|---|---|
| Re. 28,337 | 2/1975 | Singer . |
| 3,165,588 | 1/1965 | Holzer et al. . |
| 3,268,669 | 8/1966 | Vigliante et al. . |
| 3,660,606 | 5/1972 | De Witt . |
| 3,727,192 | 4/1973 | Cheney et al. . |
| 3,736,381 | 5/1973 | Johnson et al. . |
| 3,851,105 | 11/1974 | Regnier et al. . |
| 3,889,067 | 6/1975 | Reed et al. . |
| 3,908,092 | 9/1975 | Hight et al. . |
| 3,924,077 | 12/1975 | Blakeslee . |
| 3,928,727 | 12/1975 | Roche . |
| 3,955,051 | 5/1976 | Bitzer et al. . |
| 3,967,058 | 6/1976 | Moriya et al. . |
| 4,009,342 | 2/1977 | Fahrenschon et al. . |
| 4,049,908 | 9/1977 | Knorpp et al. . |
| 4,055,728 | 10/1977 | Lyon-Caen et al. . |
| 4,063,041 | 12/1977 | Vollnhals . |
| 4,081,611 | 3/1978 | Bovo et al. . |
| 4,093,827 | 6/1978 | Charransol et al. . |
| 4,119,803 | 10/1978 | Jacob . |
| 4,145,574 | 3/1979 | Wintzer . |
| 4,171,467 | 10/1979 | Evenchik . |
| 4,187,399 | 2/1980 | Mayfield et al. ...................... 370/58 |
| 4,320,500 | 3/1982 | Barberis et al. ....................... 370/60 |
| 4,322,843 | 3/1982 | Beuscher et al. ...................... 370/60 |
| 4,365,328 | 12/1982 | Merriax et al. ........................ 370/60 |
| 4,382,294 | 5/1983 | Beuscher et al. ...................... 370/58 |
| 4,392,222 | 7/1983 | Ando ...................................... 370/60 |
| 4,413,337 | 11/1983 | Dauphin et al. ...................... 370/58 |
| 4,556,970 | 12/1985 | Flanagin et al. ...................... 370/60 |

OTHER PUBLICATIONS

Averill, R. M., et al., "No. 101 EES: The Time-Division Switch Unit," *Bell Laboratories Record*, Dec. 1963, pp. 425–432.

Bonner, A. L., et al., "T1 Carrier System Signaling," *Bell Laboratories Record*, Sep. 1963, pp. 307–313.

"101 EES: A More Flexible Telephone Service for Business," *Bell Laboratories Record*, Feb. 1963, pp. 43–45.

Hughes, E. G., et al., "The No. 101 EES Control Unit," *Bell Laboratory Record*, Feb. 1964, pp. 61–66.

Sisti, L. J., "T1 Carrier System Timing," *Bell Laboratories Record*, Jul.–Aug. 1963, pp. 281–285.

Williford, O. H., "The Electronic Switching System," *Bell Laboratories Record*, Nov. 1963, pp. 374–380.

*Primary Examiner*—Douglas W. Olms
*Assistant Examiner*—Artis Kuntz
*Attorney, Agent, or Firm*—Head, Johnson & Stevenson

[57] ABSTRACT

Apparatus is provided for converting serial bit digital signals of selected line rate from a plurality of sources into a single serial bit signal for time division multiplexing (TDM) in periodic frames by a central receiver, in a system in which each source is responsive to command signals for transmitting signal information to the receiver.

4 Claims, 19 Drawing Figures

PBX TELEPHONE SYSTEM I/O INTERFACE

This is a continuation application of Ser. No. 815,769 filed Jan. 3, 1986 now abandoned which was a continuation application of Ser. No. 738,536 filed on 5/24/85 now abandoned, which was a continuation of Ser. No. 432,882 filed on Oct. 5, 1982 now abandoned.

CROSS REFERENCE TO RELATED APPLICATIONS

The subject matter disclosed herein is also disclosed, and some of it is claimed, in a commonly owned co-pending application of the same assignee entitled "PBX Telephone System Remote Synchronization", Ser. No. 432,884 filed on even date herewith by Stephen D. Flanagin et al.

DESCRIPTION

1. Technical Field

This invention relates to telecommunications systems, and more particularly to equipment for use with digital telephone systems.

2. Background Art

As known, all connections between subscriber station equipment in a common telephone system is provided through an interconnect, or matrix switch. In early telephone systems the switch provided a "hard wire" interconnect between station equipment. Later systems provided increased interconnect capability by the shared use, e.g. "spaced division multiplexing" of common wire interconnections, or by pulse code modulation (PCM) of the information coupled with time division multiplexing (TDM) of the interconnects. Nearly all contemporary systems use some type of TDM switch in which each off-hook station subscriber is allocated a specific periodic time interval for information transfer through the switch to the interconnected party subscriber(s).

The TDM type switch has N number of time slots per PCM sample time interval per M number of input/output (I/O) lines to provide a simultaneous M×N number of interconnects. If this provides simultaneous servicing of 100% of the system subscribers the switch is "nonblocking", i.e. no subscriber wait time. The number of TDM time slots per PCM sample time is limited by the telephone sample frequency, typically eight KHz.

Typical of the early TDM stored program system switches is that disclosed in U.S. Pat. No. 3,268,669 by Vigliante et al and assigned to Bell Telephone Laboratories, Inc. The switch regulated by a central control, provides subscriber equipment interconnect in one of fifty TDM signal sample time slots in each periodic signal sample frame. The subscribers compete for the fifty available call slots on a first-come first-serve queue and each time slot remained associated with the party subscriber's station equipment for the duration of the interconnect. Only an on-hook condition would release the time slot for use by the next in line off-hook subscriber.

A higher efficiency interconnect switch is disclosed by Regnier et al in U.S. Pat. No. 3,851,105, which improves the Vigliante et al system through a combined TDM and space division multiplexed scheme in which dual memories including a speech memory and a control memory temporarily store subscriber PCM information samples prior to, and after, (separate input and an output stage memories) the space division multiplexing of the individual samples through a space division switch interconnect. The memory interfaces reduces the switching overhead time by stacking the samples for presentation to the space division switch, thereby improving overall efficiency by lowering interconnect time per sample. Providing memory storage density which is twice the space division interconnect capacity provides a nonblocking characteristic. It does, however, require a combination of both TDM and space division multiplexing hardware.

U.S. Pat. No. 3,908,092 to Hight et al also discloses an improvement to the Vigliante et al system by reducing the central supervisory control overhead. Call processing is streamlined by distributed processing which occurs at a higher 15.625 KHz sample frequency. The system provides for 64 call slots per switch with 65 time slots per sampling frame, such that successive frames begin with the next higher slot number in a frame modulo 64 representing a call processing cycle. In operation, call processing occurs at the coincidence of a first call slot number with the same frame number. If the call slot number is active (off-hook) the call is processed by the system. If the call slot number is idle the system scans the remaining switch ports to determine if they have transitioned to off-hook status; the first discovered off-hook port is assigned to the idle call slot (e g. FIFO) for the interim of that active state in call processing for that port occurs on each appearance of that number frame.

DISCLOSURE OF INVENTION

The object of the present invention is to provide an improved input/output (I/O) interface for a time slot interchange (TSI) type telephone matrix switch.

According to the present invention an I/O interface for a TSI switch which allows N number of asynchronous telephone station signal sources to exchange serial signal bit data through the switch at a selected line rate, includes individual signal ports for exchanging signal information with each station source, a timing signal source for providing a clock signal at least N times greater than the selected line rate, program control circuitry for regulating the time of arrival (TOA) and time of departure (TOD) of exchanged signal information at each port, and multiplexer/demultiplexer circuitry for providing full duplex exchange of the serial bit data at each port at a bit rate which is a minimum N times greater than the line rate.

In further accord with the present invention the I/O program control circuity commands the TOA of each station's serial data at the associated port to allow real time sequential sampling of the I/O ports at the N times bit rate simultaneous with sequentially sampling of successive signal bits at each port at the selected line rate, the I/O providing each sampled port signal directly to the TSI switch.

The I/O interface of the present invention allows the serial bit signal data transmitted asynchronously from each of the plurality of sources to be sampled and formatted at the I/O interface ports in real time, without buffering at the port I/O. Sampled signal storage in the I/O is therefore eliminated and occurs, instead, in the TSI input signal conditioning stage where change in signal format necessitates storage. This eliminates redundant system storage, reduces I/O cost and complexity, and increases overall system reliability. Similarly the program control of the TOA of the source signal information at the associated ports eliminates the need for a synchronous receiver at the I/O.

These and other objects, features and advantages of the present invention will become more apparent in light of the following detailed description of a preferred embodiment thereof, as illustrated in the accompanying Drawing(s).

BRIEF DESCRIPTION OF DRAWING(S)

FIG. 8(g)-8(f) are illustrations of signal waveforms used in describing operation between the FIGS. 2, 6 elements of the present invention;

BEST MODE FOR CARRYING OUT THE INVENTION

In the present system all station equipment interfaces with the central equipment matrix switch through associated universal connecting ports. Each port is uniquely identified to the switch and the station connected to that port assumes the port identity. As such, the matrix switch interconnects ports which thereby allows communication between stations.

Figure 1:
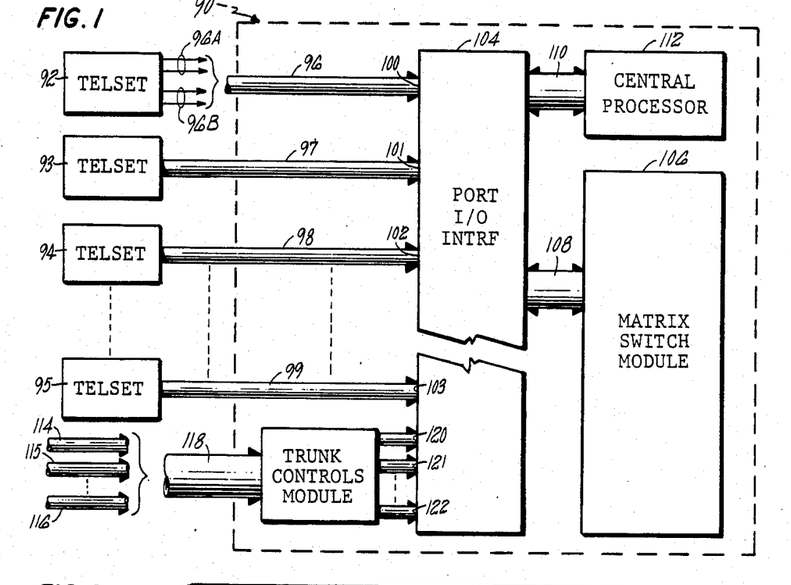
FIG. 1 is a simplified block diagram illustration of a stored program type telephone system which includes the present invention.

In the simplified system block diagram of FIG. 1, the central equipment 90 communicates with station equipment 92-95 through lines 96-99 connected to the ports 100-103 of the central equipment input/output (I/O) interface 104. The system matrix module 106 (described hereinafter) is connected through lines 108 with the I/O interface and through lines 110 with the system's main control signal processor 112.

The I/O lines 96-99 may be dual pair (e.g. 96A, 96B for lines 96). One pair provides full duplex voice (V), data (D), and control (order wire—OW) signal transmission and the second pair provides supply voltage (typical—48VDC) to the station equipment (speaker power, light panel, etc.). This four wire interconnect is the same for all station equipment, e.g. voice telephone/data terminal (telset), computer access device (CAD), or modem access device (MAD), which may be exchanged between ports without physical modification of the interface. Similarly telephone lines from outside the system are presented through trunk lines 114-116 and trunk control module 118 to ports 120-122 of the I/O interface.

Figure 8:
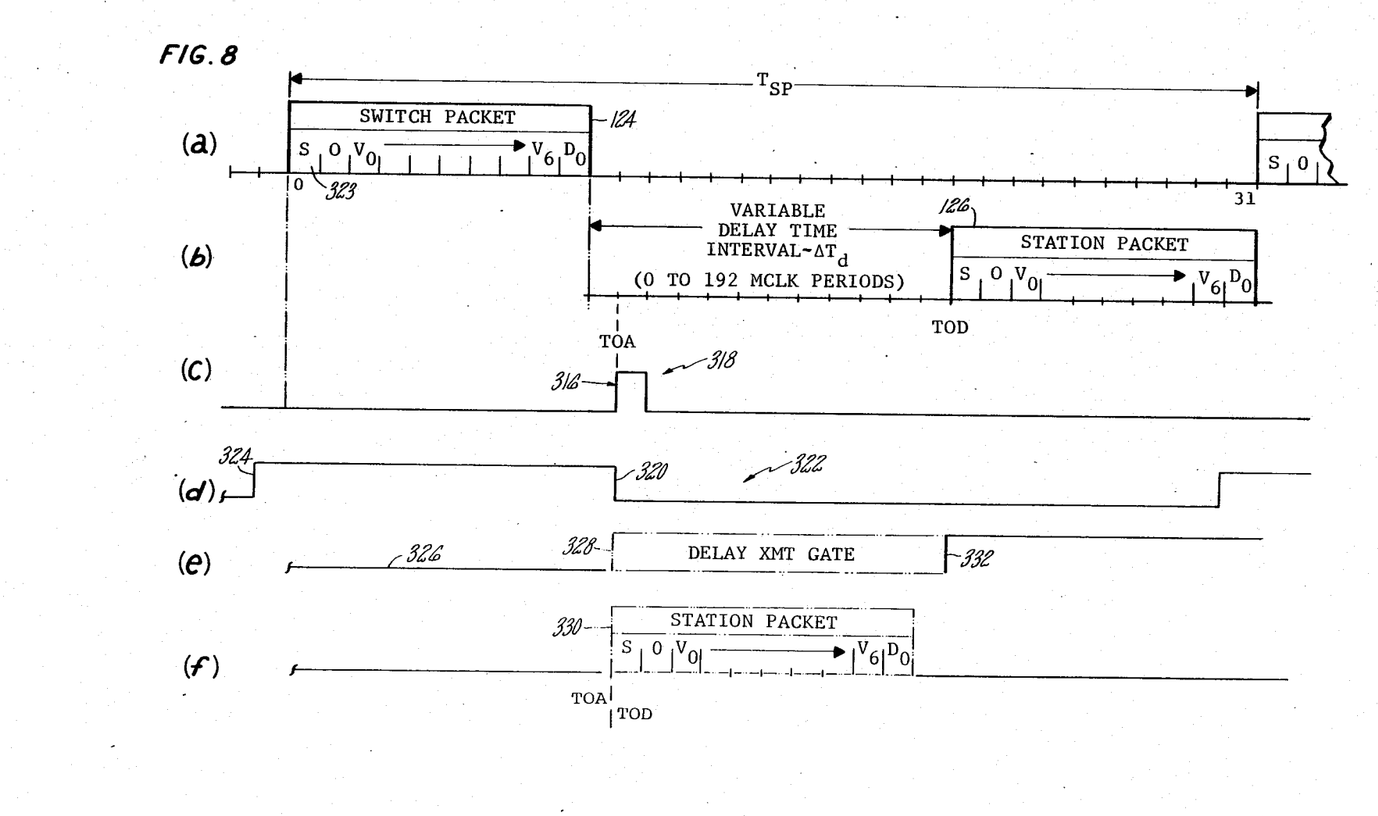

Communications between the station and central equipment is by digital "packet" signal transmission, e.g. discrete bursts of serial digital signal bits exchanged between station and switch in a ping-pong protocol. FIG. 8 illustration (a) shows a typical ten bit packet format which includes a first START(S) bit, a second control ORDER WIRE (OW) bit, seven voice bits ($V_0$-$V_6$), and one data bit ($D_0$). To facilitate the description packets originating from the switch are "switch packets" and those from the station are "station packets". Switch and station packets 124, 126 are exchanged in each sample time interval ($T_{SP}$) or frame. This occurs periodically even if the station is on-hook (idle) in which case the switch packet contains diagnostic or control information and the station packet "silence". As described hereinafter the time of departure (TOD) of each station packet to the switch is dependent on the time of arrival (TOA) of the last bit ($D_o$) of the switch packet. Depending on the propagation delay between station and switch the station packet TOD may occur immediately following TOA of the switch packet or be selectively delayed for the differential time remaining in the sample frame interval ($T_{sp}$ minus bit times of both packets).

The system timing must comport with standard telephone voice and control signal bandwidths, e.g. the voice/data bandwidth is 4 kHz and the sampling frequency is 8 kHz. Each switch/station packet exchange of the voice data bits occurs then at a 8 kHz rate or once each 125 microsecond frame. However, to facilitate full duplex packet transmission over a single wire pair in each 8 kHz (125 µS) frame a selected 256 KBPS line rate is used. Each 8 kHz (125 microsecond) frame interval includes thirty two bit times, ten bit times per packet with a maximum differential time of twelve bit times (47 µS). This allows a system using twenty gauge wire to accommodate switch to station distances up to 10,000 feet.

Each station's actual delay (TOD-TOA) is selected to make the asynchronous exchange of the isochronous packets between station and switch "appear synchronous" at the switch. The central equipment I/O and matrix switch modules (FIG. 1) operate synchronously on a 4.096 MHz Master Clock rate (MCLK) which divides each 125 microsecond (µS) frame into 512 increments. Each station monitors and corrects its internal frame time base to agree with the central equipment MCLK frame time base by synchronizing to the TOA of the switch packet. Varying the station delay time to accommodate station distance allows each station packet to arrive at the matrix switch in a preselected real time interval, and results in the "apparent" synchronization of the system.

In a best mode system embodiment the I/O interface (104, FIG. 1) comprises, in combination: a plurality of individual I/O port cards (FIG. 3), MUX/DMUX and converter circuitry (FIG. 2), and control and timing circuitry (FIG. 5) which, as described hereinafter, convert the station packet transmissions into one or more serial bit signals suitable for time division multiplexing (TDM) by the matrix switch. The port cards are identical, each servicing some portion of the total number of system ports. For a system with 512 ports there maybe 16 port cards with 32 ports each. FIG. 3 is a simplified illustration of an exemplary 32 port I/O card 128 (1 of 16). In FIG. 3 the card receives the inputs (from FIG. 1 stations 92–95) on lines 96–99 at ports 100–103. Each port includes line interface circuitry 130–132 which provides signal conditioning and line impedance matching. The current signal pair (B) of each input line is connected to a voltage source 134 and the signal information pair (A) is split: a received line $A_R$ connected to the input of a 32-to-1 multiplexer (MUX) 136 and the transmit line $A_T$ to a 1-to-32 demultiplexer (DMUX) 138, both under address and ENABLE control of the I/O control circuit via lines 140. The station packet samples are MUX'D on output lines 142 to the remaining I/O circuitry and the switch packet bits are D MUX'D from lines 144 to each related port. The lines 140, 142 and 144 from each card are included within the output lines 146 from all port I/O cards.

The switch exchanges packets with each of the 512 ports in each 8 kHz sampling frame; ten bits from 512 received packets must be sampled (5120 samples) and 5120 bits transmitted in each 125 μS period. To accommodate this throughput the receive and transmit processing is performed in parallel. Each 125 μS interval is divided by the 4.096 MHz clock into 512 MCLK pulses which in turn are grouped into four successive 128 MCLK clock pulse quadrants (quad I–IV). Each quad throughput includes the voice bits ($V_0$–$V_6$) and data bit ($D_o$) of the received (transmitted) packets on sixteen of the thirty-two ports on eight of the sixteen boards, e.g. 1024 bits. All of this is achieved, as described hereinafter, by the TOA and TOD scheduling of the exchanged packets at the switch.

Figure 9:
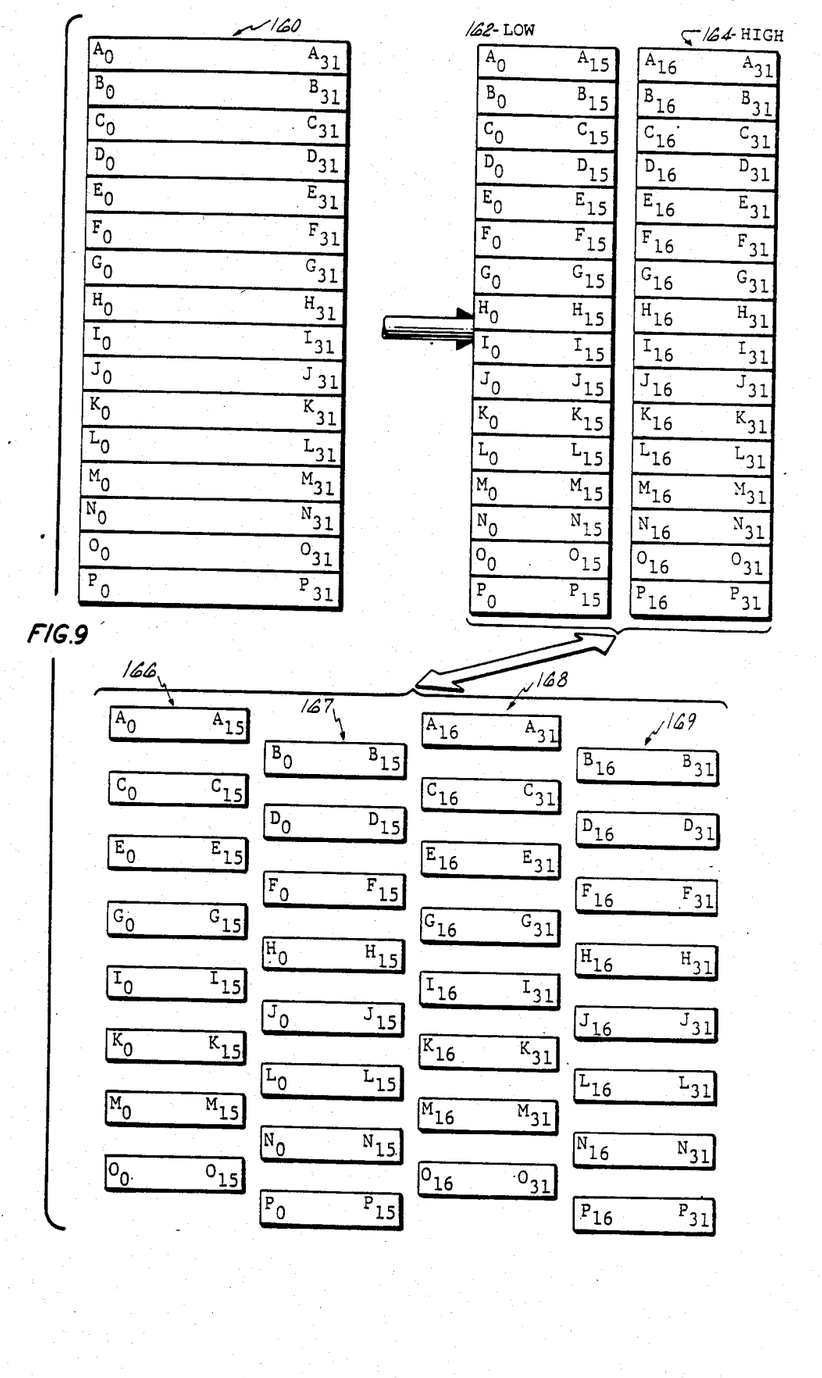
FIG. 9, is an abstract visual aid used to facilitate understanding of the description and operation of the FIG. 2 embodiment.

FIG. 9 illustrates, abstractly, the throughput (received or transmitted) of the sixteen port cards (A–P) as a coherent grouping 160. Each card has thirty-two ports alphanumerically labeled $A_o$–$A_{31}$ ... $P_o$–$P_{31}$, etc. For processing, the total throughput is divided into two sixteen channel sub-groups 162, 164 (arbitrarily labeled LOW and HIGH) and each sub-group is divided into EVEN (A, C, E, G, I, K, M, O) and ODD (B, D, F, H, J, L, N and P) card groups. The result is four information phases 166–169 (arbitrarily labeled LOW/EVEN, LOW/ODD, HIGH/EVEN and HIGH/ODD respectively), each processed in one of the four quads of each 125 μS sample interval.

Figure 10:
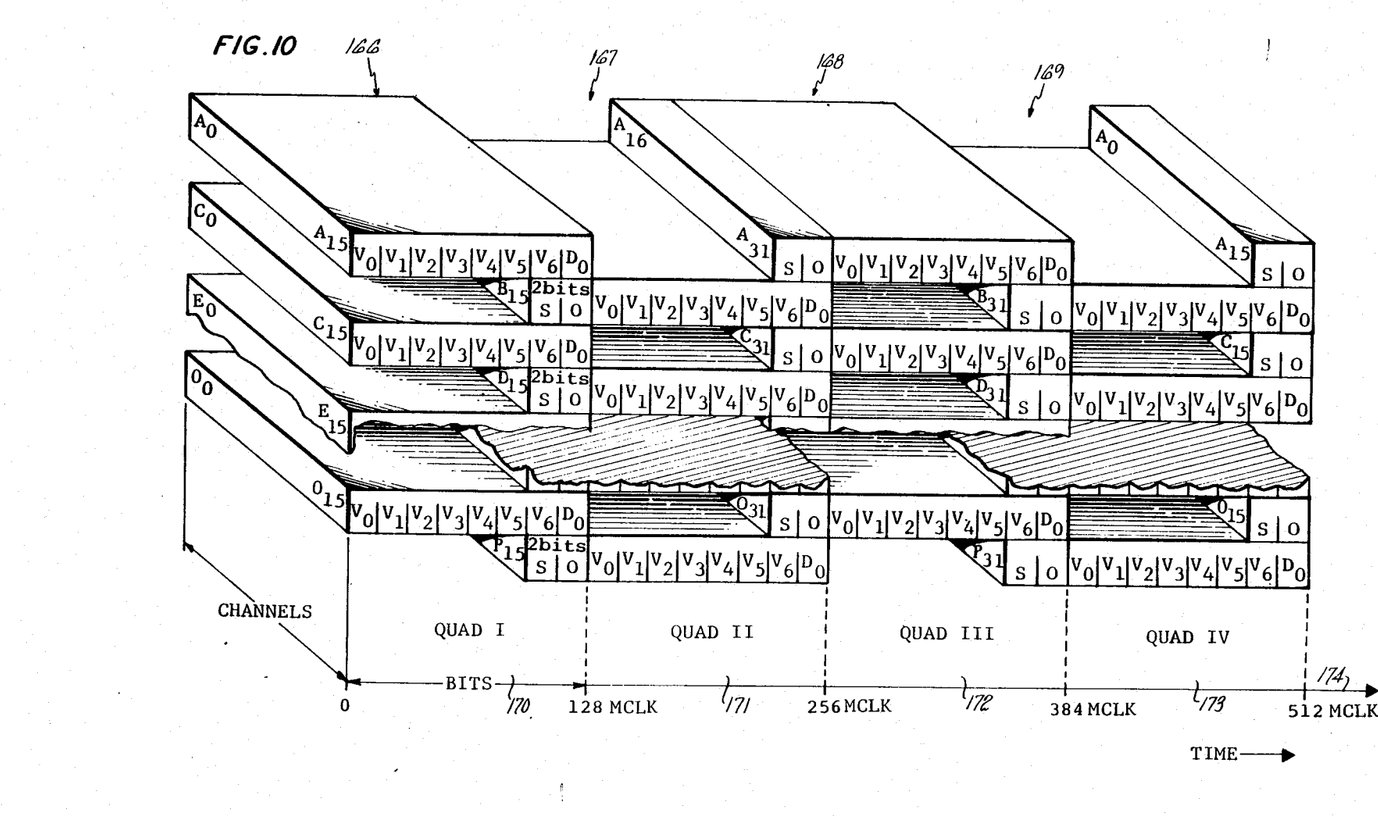
FIG. 10, is another abstract illustration used to facilitate description of a further aspect of operation of the FIG. 2 embodiment.

FIG. 10 is a partial perspective illustration of the phases arranged in associated quads 170–173 along the real time axis 174. Once again it may represent either receive or transmit information scheduling. As shown, the card ports are spatially arranged side-by-side along an axis orthogonal to the time axis and the packet bits (which are real time) are serially arranged along the real time axis. Since each quad has a 31.25 μS duration (128 MCLK pulses) which is equivalent to only eight bit times ($\approx 3.91$ μS) of 16 MCLK pulses each, two of the bits in each packet overlap into adjacent quads. These are the overhead START(S) and ORDER WIRE (0) bits which overlap into the preceding quad; this provides the "interleaved" effect illustrated which, as described hereinafter, is eliminated by stripping off the S and O bits for separate processing from the voice and data bits downstream of the port I/O interface.

Figure 11:
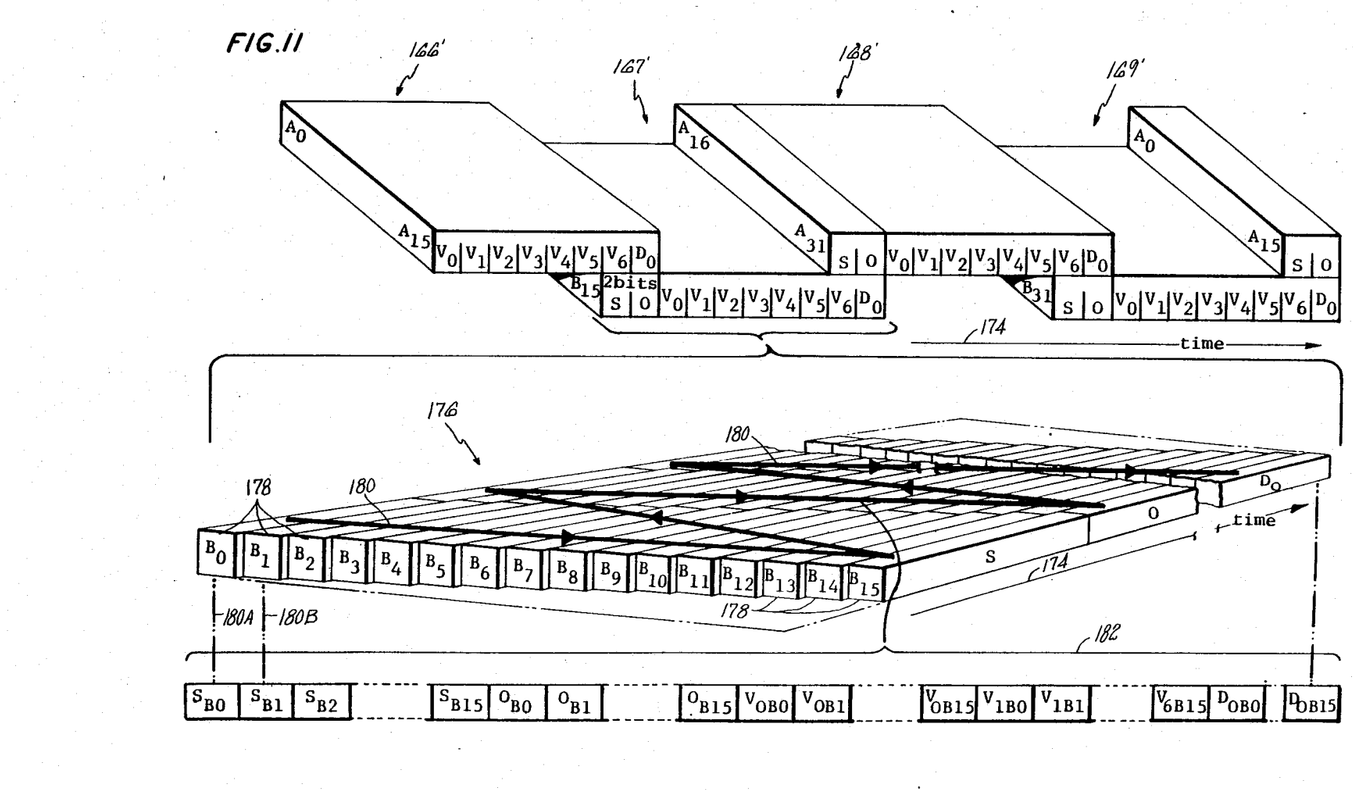
FIG. 11, is yet another abstract illustration used in describing operation of the FIG. 2 embodiment.

FIG. 11 is a perspective illustration of the first tier (e.g. port cards A, B) of the FIG. 10 illustration, labeled 166'–169'. The first tier segment 167' (ports $B_o$–$B_{15}$) is separately shown in partial perspective illustration 176, which assumes the received station packet signal processing mode. The station packets arrive at the I/O ports 178 in spaced one MCLK period intervals. In other words adjacent ports have station packet TOA's differ by one sixteenth of a bit cell time. As a result, MCLK clock rate samples of all sixteen ports may be taken serially within one bit cell time. The sampling is provided by the MUX 136 (FIG. 3) in a raster pattern 180 and multiplexed 182 onto line 142. Common bit types (180A, 180B) are grouped serially in the multipled pattern in a "serial bit interleaved" fashion, e.g. $S_B, S_{B1}, \ldots S_{B15} O_{BO} O_{B1} \ldots O_{B15} V_{OBO} \ldots$ etc.

As described hereinafter, the START (S) and order wire (0) bits are stripped off of the serial data stream from each port card and presented directly to the I/O control circuitry. This eliminates the "overlap" of the S and 0 bits between quadrants at the matrix interface with the I/O module (lines 108, FIG. 1). In FIG. 11, all station packet bits are shown interleaved. In other words sixteen port samples of START (S) bits followed by sixteen port samples of order wire (0) bits; the serial bits of any given port may be recreated by taking each sixteenth bit in the serial stream, beginning with the particular port's START bit.

Figure 2:
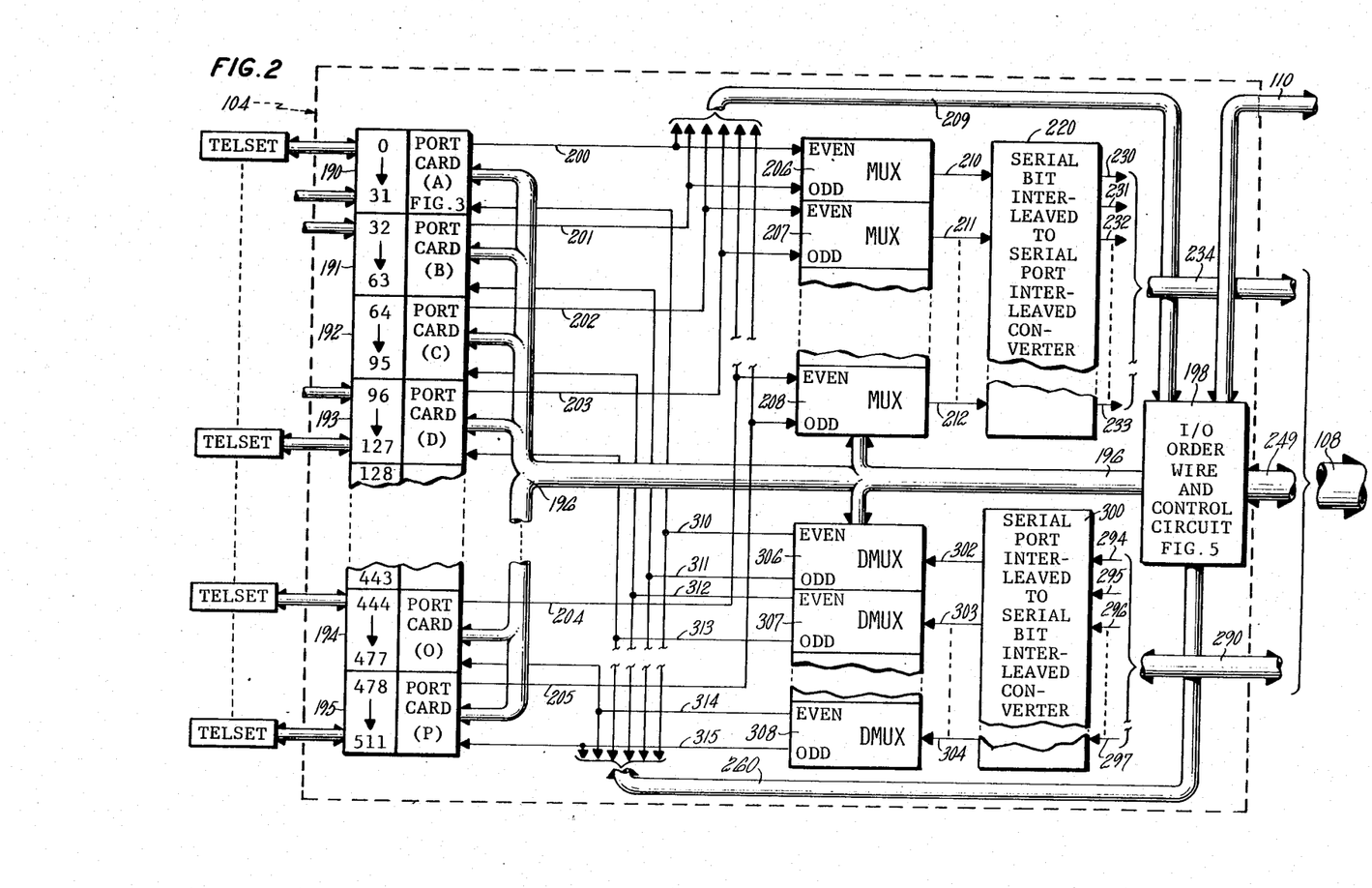
FIG. 2 is a simplified block diagram illustration of the preferred embodiment of one element of the present invention, as used in the sytem of FIG. 1.
Figure 3:
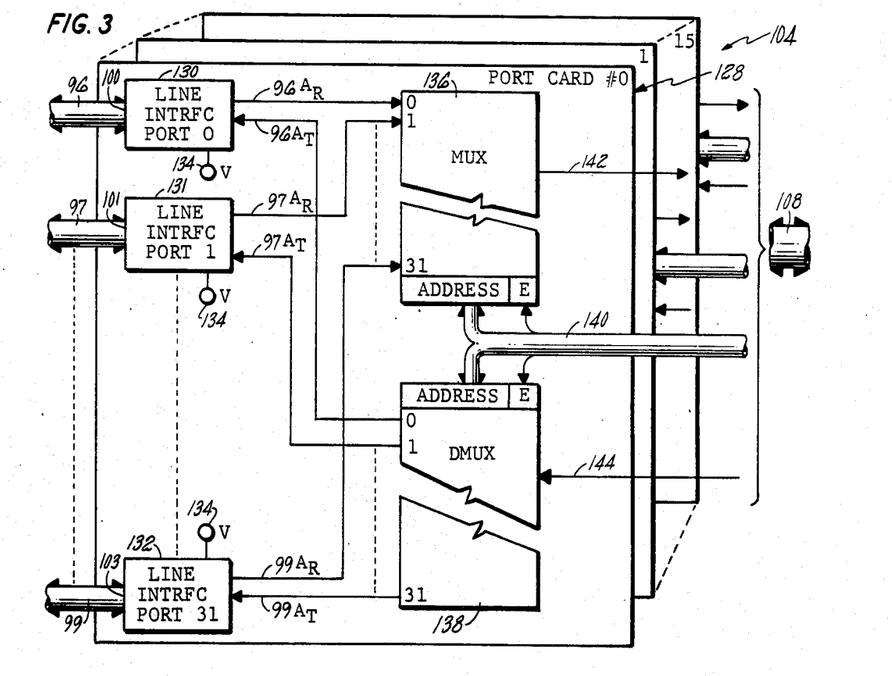
FIG. 3 is a simplified block diagram illustration of one element of the embodiment of FIG. 2.

FIG. 2 is a detailed diagram of the central equipment 90. The port I/0 interface 104 includes the plurality of individual port cards 190–195 (e.g. 16 for a 512 port system) each having thirty-two ports as exemplified by the port card (128) embodiment of FIG. 3. The port cards 190–193 represent information groups A, B, C, D and cards 194, 195 represent information groups O, P (FIGS. 11–13) as labeled alphabetically. The cards are under address and enable control of the I/O control circuit 198 through lines 196 within the I/O interface 104. The serial interleaved voice ($V_0$–$V_6$) and data ($D_0$) bit samples from each card are presented through an associated one of the lines 200–205 to a related one of the two-to-one multiplexers 206–208. The overhead START(S) and OW bits are stripped off each port card's output line and presented through lines 209 directly to the system control circuit 198 which processes the order wire (0) bit control information to govern communication between the port I/O and station equipment and provide matrix switch control.

Figure 4:
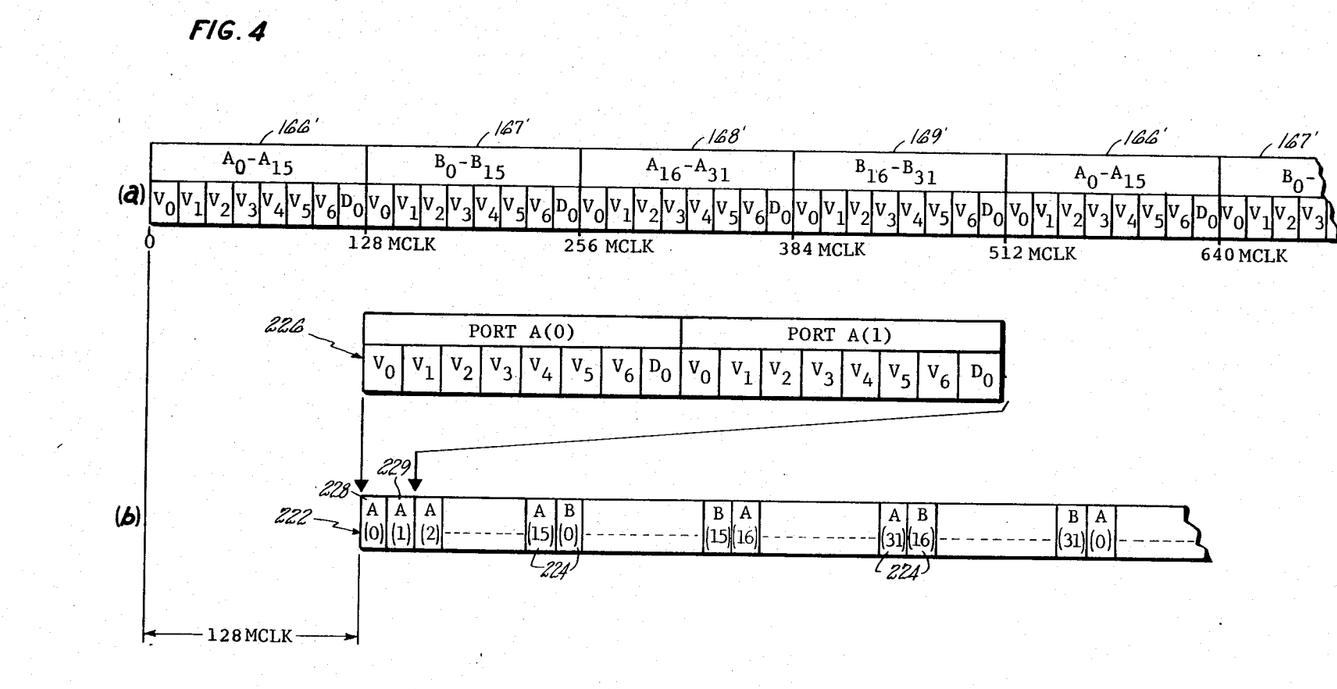
FIGS. 4(a) and 4(b) are illustrations of signal waveforms used in the description of the embodiment of FIG. 2.

The MUXs 206–208 include even and odd inputs (arbitrarily related to the EVEN and ODD designations given the port cards) and each operates half time on information from an even port card and the other half on information from an odd card. Assuming EVEN card information arrives at the I/O ports ahead of the ODD, e.g. information from port card 190 (alt. A of FIG. 12) arrives in quads I, III while that from port card 191 (alt. B of FIG. 12) arrives in quads II, IV, the MUX 206 first multiplexes the serial interleaved data from the first 16 ($A_o$–$A_{15}$) ports of card A followed by the first 16 ($B_o$–$B_{15}$) ports of card B, the next 16 ($A_{16}$–$A_{31}$) from card A and so on. The result is a "compacted serial bit interleaved" stream in which serial interleaved data from two separate cards in turn multiplexed together at the output of the MUX, as shown in FIG. 4, illustration (a) by the compacted serial interleaved data stream for the first tier 166'–169' (FIG. 13). Note, in FIG. 4(a) each illustrated bit cell (e.g. $V_o, V_1$, etc.) includes sixteen serial one MCLK samples, one from each port (e.g. $A_o$–$A_{15}$) of the related card.

The FIG. 4,(a) compacted serial interleaved bit data from each port card pair (eight total) is presented through associated lines 210–212 to a related one of eight inputs of a Serial Bit Interleaved-to-Serial Port Interleaved (SBI/SPI) Converter 220. The Converter 220 restructures the interleaved signal bits into a serial port data stream in which the packet bits from a common port are contiguous. In other words it groups the serial voice and data bits of each port together in a word unit. It does this by storing each received compacted serial interleaved signal in RAM (random access memory) and reading out, by selective addressing, the individual bits by common port association. This, for sake of description, is called a serial port interleaved signal and is shown by waveform 222 of FIG. 4(b); the waveform 222 includes serial bins 224 each of which include the voice and data bit content from a common port. The waveform 226 illustrates the bit content of bins 228, 229 as comprising the voice and data bits of port $A_0$ and port $A_1$.

FIG. 4, illustrations (c)–(f) show the signal formatting at the converter output on lines 230–233 for the tiers (A, C, E and O) of the quad I information phase 166 (FIGS. 11, 12). For the 512 port embodiment there would be eight parallel serial data streams, all synchronous with common voice and data bits in each stream appearing simultaneously in register. The data is presented through lines 234 to matrix switch 106, which in a best mode embodiment may be a time slot interchange (i.e. time division multiplex) type matrix module.

Figure 5:
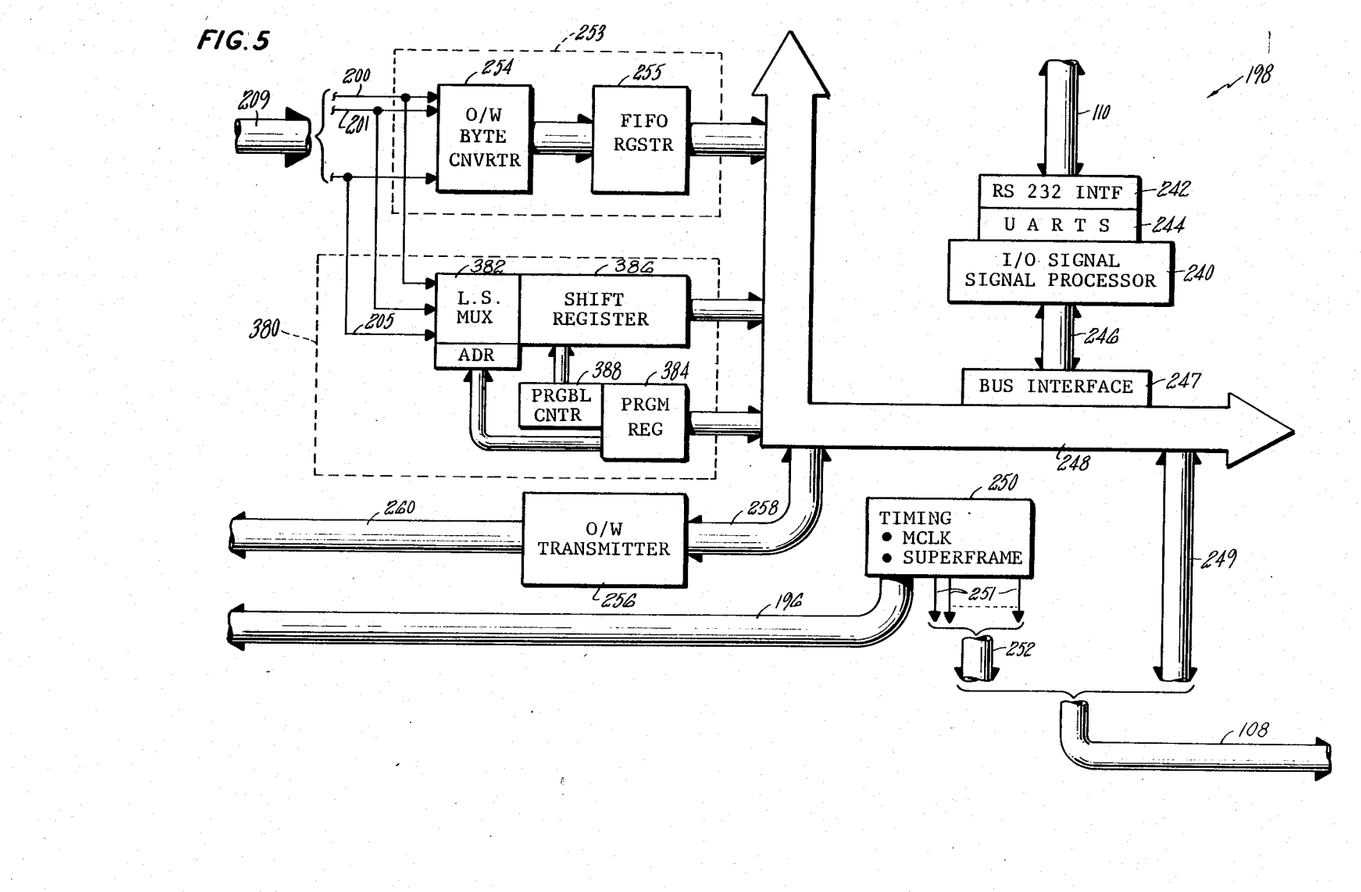
FIG. 5, is a block diagram illustration of another element of the FIG. 2 embodiment.

FIG. 5 is a simplified system block diagram illustration of the I/O control circuit 198 (FIG. 2) which provides the central switching and control of the PBX system ports. It is under real time control of the PBX system main central processor (CSP) 112 (FIG. 1). The control includes its own signal processor (MSP) 240 which may be a known type microprocessor such as the Zilog Z-80 MP with RAM and PROM memory. The signal processor communicates with the MCP through full duplex RS232 and universal asynchronous receive/-transmit (UART) interfaces 242, 244 and communicates with the matrix and central system functional hardware through output lines 246, bus interface 247, and I/O interface data bus 248. The Z-80 controls the remainder of the switch through lines 249. It accepts command inputs from the MCP and executes the necessary functions to make voice and data connections, transmit and receive order wire (OW) control characters, connect the ports to steady and/or timed tones, established port synchronization (i.e. setting the station packet delay time) as described in detail hereinafter, and to perform port digital diagnostics.

The stations equipment, e.g. telsets, etc. (92–95, FIGS. 1, 2) and all other relevant types of station equipment operable with the PBX system, are all microprocessor based machines that interact with the matrix switch by control messages formed from the order wire (0) bit control characters. These control messages are themselves comprised of one or more eight (0) bit bytes. With only one order wire (0) bit transmitted with each packet each control message byte between the matrix and a station must be transmitted on successive eight packets (alt. "frames"). While each packet start (S) bit synchronizes the individual packet transmission between matrix and station the control message byte must be individually synchronized. As such, an order wire start bit (0S) precedes each control byte resulting in a minimum nine bit control word and requiring a minimum of nine frames per word. In the illustrative embodiment a sixteen frame interval, e.g. "Superframe", is used to transmit each control byte. The Superframe is equal to sixteen 8 kHz frames (which means that there are seven unused order wire bits in each Superframe) with an interval time of two milliseconds. In FIG. 5 the MCLK timing circuitry 250 with output lines 251, includes a crystal oscillator (not shown) which establishes the MCLK frequency of 4.096 MHz and a fourteen bit counter (not shown) which divides down the MCLK frequency to mark the two millisecond (500 Hz) Superframe interval. This is the least common timing denominator for the sytem; marked every two milliseconds by the 0S bit "synch signal" and giving a control wire bandwidth of 500 bytes per second. These time base signals, in addition to appearing on the lines 251, are included in lines 196 to the I/O port cards and MUX-/DMUX, and in lines 252 to matrix module (106, FIG. 2).

The I/O control order wire (0) bits stripped from the station packets from the port card are received on lines 209 at the input of an order wire (0/W) receiver 253. The receiver includes an 0/W byte converter 254 and a first-in - first-out (FIFO) register 255. The byte converter detects the bit-by-bit control messages from the ports as they appear, following the order wire start (0S) bit of a given Superframe. A 512×8 bit RAM (not shown) in the byte converter stores each station's eight bit control byte as received, e.g. the eight bits are stored as they appear on the incoming lines, scrambled with those of other ports. Complete bytes are descrambled by selective addressing of the RAM and tagged with the nine bit port address. The combined seventeen bit block (port address and control byte information) is written into the FIFO register. The control signal processor (CSP) polls the FIFO periodically and reads the identified bytes sequentially via the bus 248.

Control messages from the I/O to the stations are formed in an 0/W transmitter 256 which is loaded by the CSP via the bus 248 and lines 258 in response to commands from the system MCP (112, FIG. 1). The 0/W transmitter timing is from the control timing circuitry 250, and the transmitter is synchronized by the Superframe mark to the timing of the port I/O module. The transmitter includes an 0/W START BIT (0S) RAM (not shown) having 512 flag bits. The transmitter also includes a second 0/W CHARACTER RAM containing one byte of message space for each port in the system. In operation, the transmitter completes one operational cycle in each Superframe. One of the 16 frames is used to load the flags of the 0/W START BIT RAM; the matrix signal processor then uses the following six frames to load the 0/W CHARACTER RAM with the bytes it wishes to send to the ports. During the last nine frames the 0/W transmitter, driven by the matrix state counter, places the control messages on the output control lines 260 through the related port card to the particular station equipment.

As stated before, the PBX matrix switch (106, FIG. 1) is a time division, or time slot interchange switch of a type known in the art. The matrix switches the serial station packets through time division multiplexing (TDM) in designated time slots, through voice and/or data memories, and retrieves the returning switch packet in similar fashion for presentation to the stations via the I/O interface. The return switch packets are presented in an identical serial port interleaved format to the I/O interface through output lines 290 which include lines 294–297, e.g. the same format as that on lines 228–231. Similarly, a serial port-to-serial bit interleaved converter 300 provides the converse of converter 220, providing the serial bit interleaved format on lines 302–304 to the DMUXs 306–308 which demultiplex the serial interleaved voice and data bits onto lines 310–315 to the port cards (A, B, etc.) of I/O interface 104. The port cards in turn demultiplex the serialized data to each of the 32 ports associated with that card, in a reciprocal fashion to that provided by the port card MUX (e.g. the MUX 136, FIG. 3). Ultimately the demultiplexed switch packets appear on the transmitting wire pair (e.g. 96$A_T$, 97$A_T$, etc.) of each of the interconnecting lines (96–99, 120–122, FIG. 1) to the station equipment and trunk lines.

In the present PBX the switch is nonblocking due to use of preassigned time intervals, or slots in which the station and switch packets must clear the MX. The assigned slots are dedicated notwithstanding the status of the port's station equipment, e.g. "off-hook" or idle (in which case it may be used to exchange diagnostic information, O/W messages, or simply silence). Since the station packets converge at the MX while the switch packets diverge to the various stations, it is the TOA of the station packets at the MX in the assigned time slot which is critical. In other words, lack of synchronization interferes with station communication with the MX but not central equipment communication with the stations. This is an important system characteristic which allows for the diagnosis and correction of the system faults causing lack of the synchronization. As a result, it is essential that TOA of the station packets are synchronized at the switch. This is provided by the "supersync" pulse which marks each Superframe. This supersync pulse is one MCLK clock period wide (244 nanoseconds), equal to the spacing between TOAs of adjacent sample ports at the I/O interface (104, FIG. 1), i.e. the system's signal sample granularity. FIG. 11 illustrates with partial perspective 176 the critical TOA of adjacent sampled station packets at the port I/O interface.

Although signal propagation time from port to MX is infinitesimal, propagation time between the station equipment and the central equipment ports may be significant. For a given propagation delay of 1.7 nanoseconds/foot a 72 foot change in location of the station equipment connected to a port results in a one MCLK shift in that station's packet TOA at the switch (allowing for delay in both directions). To ensure synchronization of all station packets at the MX a variable time delay ($\Delta T_d$) is used to control each station packet transmission as a function of the TOA of the switch packet at that station and the empirically measured propagation delay between that station and the MX. Referring to FIG. 8, the variable time delay $\Delta T_d =$ TOA$-$TOD, or N MCLK times. In this embodiment N is approximately 160 MCLK for a port device less than 72 feet from the switch, or $T_d = 39.06$ microseconds. The switch packet TOA is marked by the rising edge 316 of a TSYNCH pulse 318 generated by the station equipment (described hereinafter with respect to FIG. 6). The TSYNCH pulse occurs at a selected number of MCLK time intervals following the arrival of the last arriving bit $D_o$. This enables the DELAY gate (326 illustration d). Depending on the required delay interval for the particular station the delay gate may immediately strobe (328) the returning station packet (phantom packet waveform 330, illustration e) for a minimum delay interval corresponding to a maximum station distance or provide a maximum delay strobe (332) for a minimum station distance.

Figure 6:
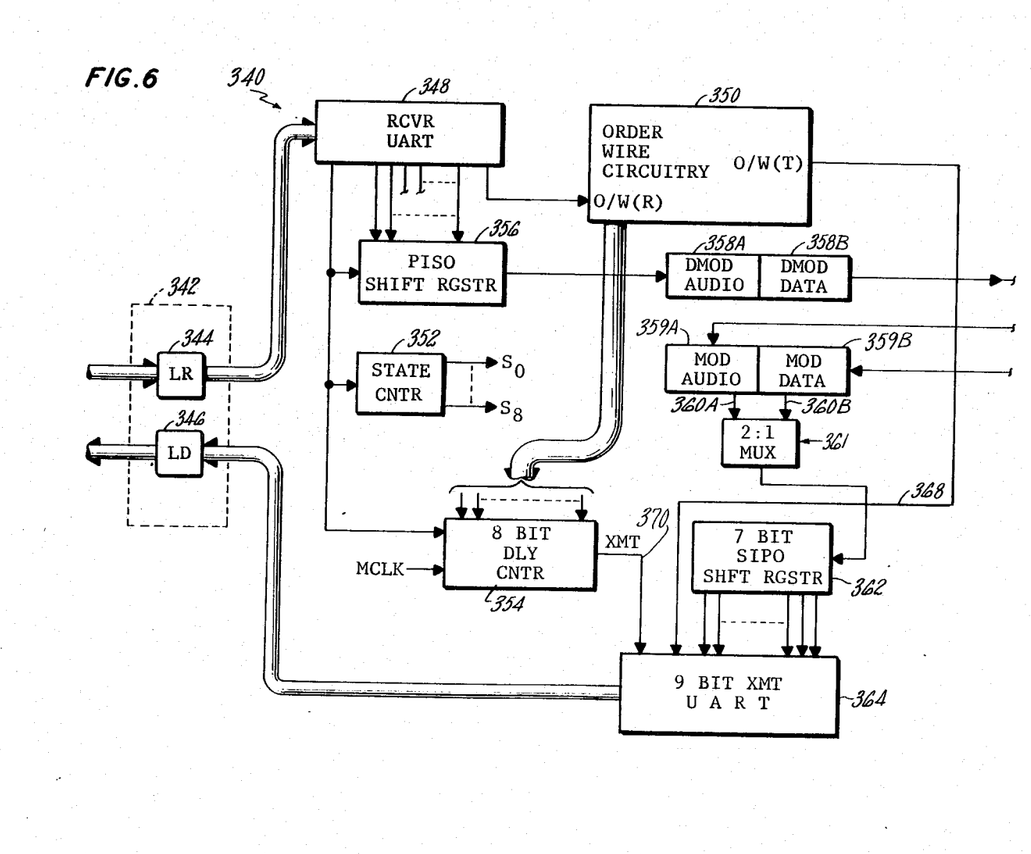
FIG. 6, is a simplified block diagram illustration of the preferred embodiment of another element of the present invention, as used in the system of FIG. 1.

Referring to FIG. 6, in a simplified system block diagram of typical station equipment architecture the station equipment 340 includes an I/O interface 342 with line receiver 344 and line driver 346. The received switch packets are sharpened up by the line receiver and provided in serial format to UART interface 348. The UART, queued by the rising edge 324 of the XMT/REC gate signal 322 (FIG. 8(d)), detects the switch packet START bit edge transition and establishes fixed interval sampling (typical 16 MCLK periods) for the succeeding nine bit cell times. On the equivalent eleventh bit cell the UART provides the TSYNCH pulse (318, FIG. 8 (a)) to: order wire circuitry 350, state counter 352, and delay counter 354. In this embodiment the delay counter is eight bits (to accommodate the maximum value delay interval). Since the switch packet transmission is periodic and synched to the central equipment FRAME SYNC and the TSYNCH signal is in fixed relation to TOA of the switch packet at the station, TSYNCH represents FRAME SYNC and is used to reset the station's time base on every sample time interval and to initiate the delay time countdown for the station's response.

In the FIG. 6 embodiment the switch packet voice and data bits are loaded in parallel from the UART to a parallel-to-serial shift register 356; the order wire (0) bit is separately stripped and provided directly to the order wire circuitry as potential control message information in a Superframe interval. The eight bits are loaded at a 64 KBPS rate (56 KBPS voice and 8 KBPS data). The register output is serially loaded to demodulation circuitry 358 which reconstructs the analog audio; a separate data bit demod 358A provides data reconstruct. In data only applications all eight data bits may be transmitted at the 64 KBPS.rate, e.g. where the station equipment is a computer access device (CAD).

The station packet response (voice/data or data) is formulated in modulation circuitry 359 which provides the voice or data bits serially through lines 360A, B and two-to-one MUX 321 to serial-to-parallel shift register 362, which loads the voice/data or data only bits in parallel to a nine bit XMT UART 364. The station order wire bit (O/W (T)) is loaded through line 368 directly to the UART. The station packet inforamtion is formulated in the off time and loaded into the UART at the appearance of the TSYNCH signal and transmitted when enabled by the delay gate XMT provided by the delay counter 354.

The delay counter is loaded with eight bits of information representing the predesignated delay time interval defining the TOD of the station packet response. The eight bit delay is provided by the order wire circuitry based on the control message exchange with the control circuit signal processor. With the appearance of TSYNCH designating TOA of the switch packet, the delay counter counts down the delay value in MCLK intervals. At zero crossover it provides the XMT gate enable on the line 370 to the XMT UART which then strobes out the station packet in serial bit format through the I/O interface 342 to the central equipment.

Figure 7A:
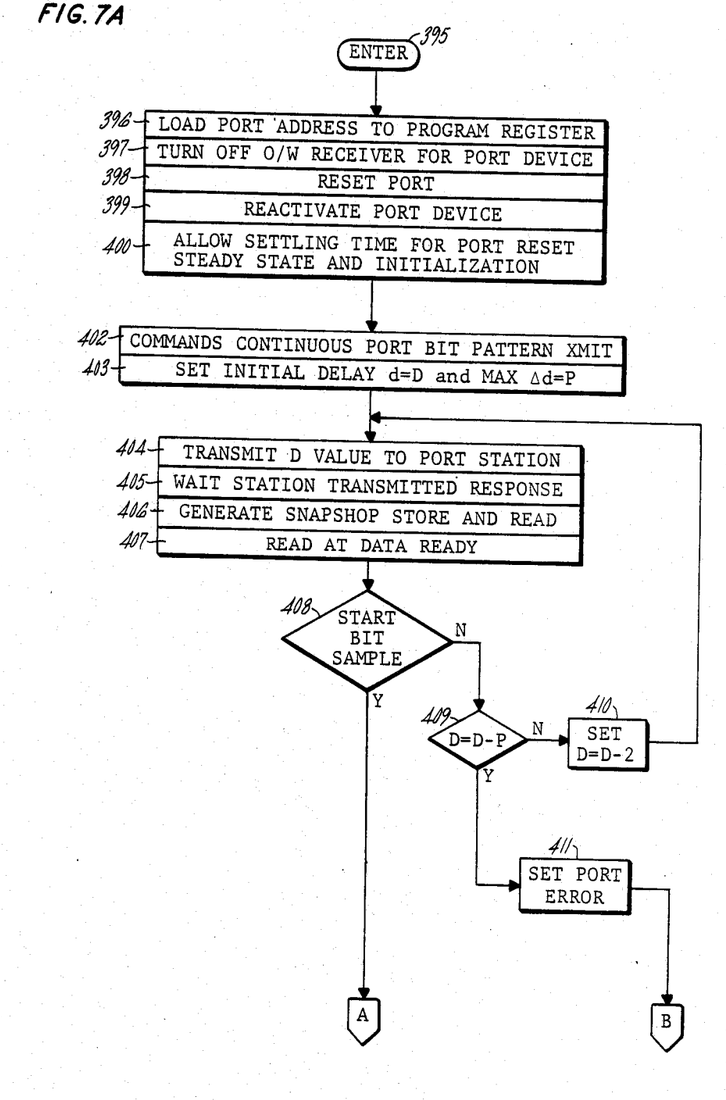
FIG. 7A, is a first portion of a Flow Chart Diagram of the joint operation of the FIGS. 2, 6 element embodiments of the present invention as used in the system of FIG. 1.
Figure 7B:
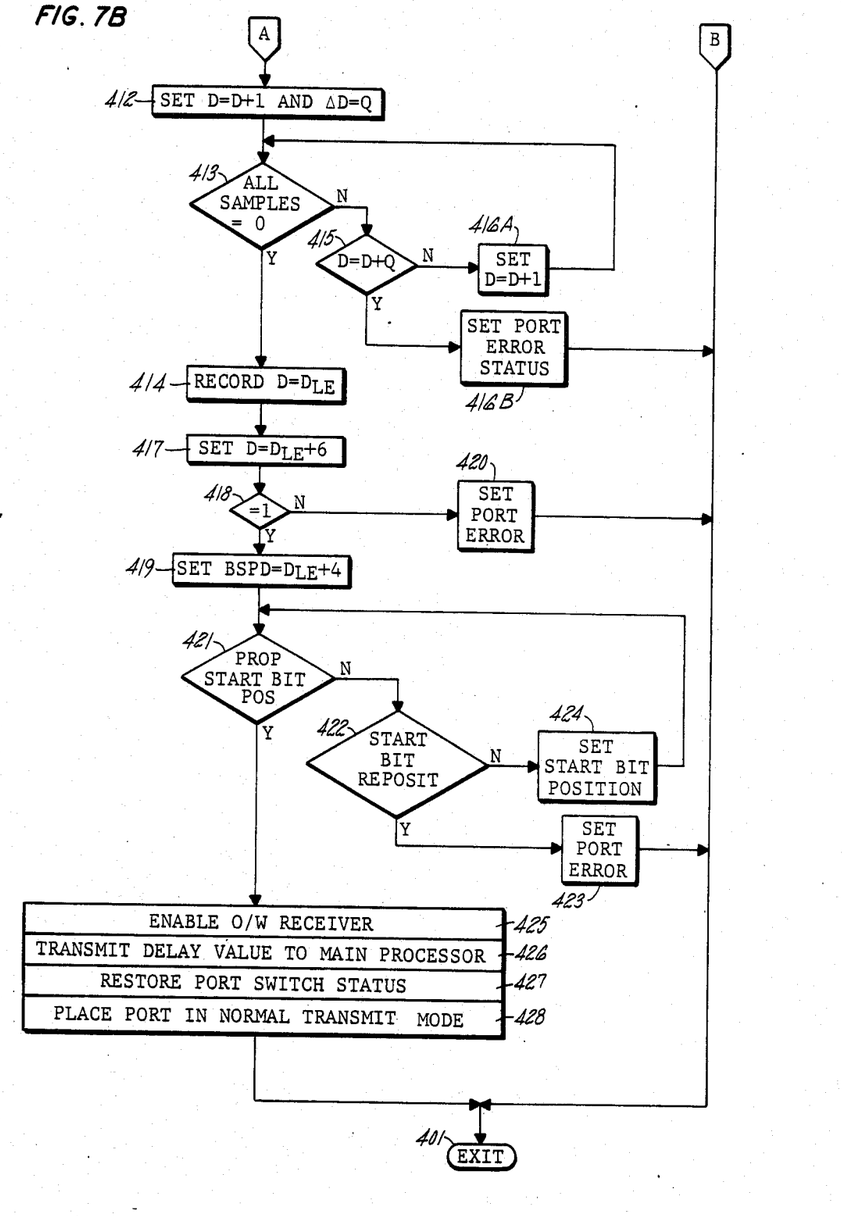
FIG. 7B is a last portion of a Flow Chart Diagram of the joint operation of the FIGS. 2, 6 element embodiments of the present invention, as used in the system of FIG. 1.

The actual station delay value is emperically determined by an iterative process between the main switch and the station. This process, described hereinafter with respect to FIG. 7, is performed by the I/O signal processor 240 (FIG. 5) in conjunction with Delay Snapshot circuitry 380 included in the I/O control. This snapshot circuitry includes a line select MUX 382 connected to each of the port card output lines (200-205, FIG. 1) and under address control of the processor 240 via a program register 384. An N bit shift register 386 receives the output of the select MUX and is clocked by a programmable phase counter 388 programmed by the program register to run with any phase of the frame timing (Quads I-IV, FIGS. 9, 10). The actual value of N is dependent on the number of port examples per frame phase. In the present embodiment with sixteen port samples per phase N=16. By selecting the desired one of the port card output lines with the MUX and by programming the phase of the strobe generating counter 388, the delay snapshot register will DMUX the sampled data from the selected one of the ports into its sixteen bit holding register where it can be read directly by the processor.

Using the delay snapshot hardware the processor can verify that the bits returning in a given station packet are correctly aligned in time, within the frame. Any port can be selected for examination by writing the port address into the line bit control register. In operation, the processor enters the delay set-up routine of FIG. 7 at 395 and executes an initializing subrouting with instructions 396-400 which set the initial conditions for the ports station equipment. Instructions 396 request the control processor to enter the port address to the program register (384, FIG. 5). Instructions 397-400 provide the equipment set-up by: turning off the O/W receiver for that station (397), resetting the station equipment (398), reactivating the station equipment (399) and waiting a settling time interval to allow the station equipment to perform initialization (400).

The sequence for the delay set-up begins with instructions 402 commanding the station to transmit back a continuous pattern. Instructions 403 establish the initial delay value, i.e. the initial guess, which may be any selected value. Generally the system midpoint value is used (approximately 120 MCLK, FIG. 8), and then incremented or decremented based on emperical results. Instructions 404-407 transmit the delay value, wait for station response, generate snapshot request (e.g. store for read), and wait for data ready.

The delayed transmission MUX'D into the 16 bit holding register, represents bit samples of the station transmission, or 256 MCLK periods. As shown by FIG. 8 this span covers the entire conceivable time span for the station packet START bit, such that one of the sampled bits should include a logic one START bit sample. In this embodiment, however, the signal format is a return to zero (RZ) such that a logic one is high for only one-half (8 MCLK) the bit time. To account for absence of a one in any bit sample the delay value is decremented by two MCLK periods for eight samples with decisions 408, 409 and instruction 410. If no logic one is found after eight samples than instructions 411 set PORT ERROR flag and the processor exits at 401.

With appearance of a START bit one sample (decision 408) the processor executes a START bit centering routine with instructions 412-420. The initial step requires locating the START bit leading edge (LE). Instructions increment the last delay set value by one MCLK and decision 413 determines if all sixteen samples are zero. If YES, instructions 414 record the delay value for the leading edge condition as $D=D_{LE}$. In NO, decision 415 determines if the delay has been incremented by the maximum selected value Q (in this case Q=12 MCLK, but this is only illustrative); if NO instructions 416A increase the delay by one and if YES instructions 416B set a PORT ERROR status and the processor exits at 401.

With location of the leading edge. the START bit minimum width is verified. Instructions 417 increment the leading edge delay by six MCLK and decision 418 determines the continuing presence of a one. If YES (indicating presence of at least a minimum satisfactory pulse width) instructions 419 set the "best sampling point delay" (BSPD) value as leading edge plus four MCLK (BSPD=$D_{LE}$+4). This step allows normal port signal sampling to be done at the center of the nominal two microsecond wide RZ pulse. If NO, instructions 420 again set a PORT ERROR status and the processor exits at 401.

With establishment of the BSPD value the START bit (if not already properly positioned) is positioned in the proper cell of the sixteen bit sample, e.g. the START bit position for the port in the frame as established by the I/O control timing. This occurs with the positioning subroutine. Decision 421 determines if the start hit is in the proper bit cell position. If NO, decision 422 determines if START bit has already been repositioned. If previously repositioned, instructions 423 sets PORT ERROR; if not previously repositioned, instructions 424 adjusts the bit and resamples. Following a yes to decision 421 the processor restores normal operation to the port with instructions 425-428 and exits at 401.

The delay set-up is generally performed simultaneously on a number of ports; the interim sampling delays per port allowing this to happen. As such the routine may be built in to normal operation of the system with centering subroutines performed routinely on all ports, periodically. Similarly, the relocation of station equipment from port-to-port or from location to another on the same port may be automatically accounted for.

The port snapshot delay circuitry and procedure provide the required I/O synchronization of the individual, asynchronous signal transmissions from the stations. This permits I/O port card sampling of the station packets in real time, without the necessity of data sample storage and asynchronous receivers on the individual, port cards. Instead the required. sample data storage is deferred until the bit interleaved to port interleaved converter stage 220 (similarly port-to-bit converter 300) where time storage is centrally located and is necessarily required to rearrange the sample bits. This provides important economic advantages in both hardware (economics of scale) and time (required sampling store time interval).

Similarly, although the invention has been shown and described with respect to a best mode embodiment thereof, it should be understood by those skilled in the art that the foregoing and various other changes, omissions and additions in the form and detail thereof may be made therein without departing from the spirit and scope of this invention.

We claim:

1. Input/output (I/O) interface apparatus for use with a time slot interchange (TSI) matrix switch which exchanges serial bit signal packets in each sample frame of a source sample frequency with N number of asynchronous signal sources, at a source line frequency, comprising:

plurality of signal ports, one signal port associated with each signal source, for receiving and transmitting the signal packets between the TSI matrix switch and the associated source;

timing means for providing a clock signal having a clock frequency at least 2 times higher in frequency than the source line frequency and having a clock time period;

program control means, responsive to said clock signal and to each of the n number of sources, for regulating the length of a real time interval between the time of arrival (TOA) and the time of departure (TOD) of the signal packets at each said signal port in dependence on the source line frequency and for regulating the actual TOA and actual TOD of the signal packets at each said port in dependence on said clock frequency; and signal transfer means responsive to said clock signal and to said actual TOA and said actual TOD of the signal packets at each said port, for exchanging the serial bit signals of each signal packet between each said signal port and the TSI matrix switch at a signal bit line frequency substantially equal to said clock frequency.

2. The apparatus of claim 1, wherein said signal transfere means comprises:

multiplexing means, responsive to said clock signal and to said actual TOA of the signal packets received from the N number of signal sources in each sample frame at each said port, for sampling the N signal packets in a plurality of successive input segment signals equal in number to the number of bits in the signal packets, each said input segment comprising single bit samples from each of the N signal packets, said single bit samples arranged serially at said bit line frequency, successive segments occurring at a segment frequency substantially equal to the source line frequency, and for presenting said input segments in real time to the TSI matrix switch; and demultiplexing means, responsive to said clock signal and to said actual TOD of the signal packets from each said port, for demultiplexing a plurality of output segment signals received from the TSI in each sample frame at said segment frequency and said bit line frequency, into N number of individual signal packets, said demultiplexing means presenting successive bits of each said output segment signal to successive ones of said signal ports at spaced real time intervals substantially equal to said clock time period.

3. A method for exchanging serial bit signal packets between N number of asynchronous signal sources and a time slot interchange (TSI) matrix switch in each sample frame of a source sample frequency, each signal packet including M number of serial signal bits at a source line frequency, comprising the steps of:

designating N number of signal ports, one signal port associated with each signal source, for receiving and transmitting the signal packets between the TSI matrix switch and the associated source;

providing a clock signal at a clock frequency at least N times higher in frequency than the source line frequency, and having a clock time period;

controlling, in each sample frame, the time of arrival (TOA) of the signal packet received at each said signal port from the associated signal source and the time of departure (TOD) of the signal packet transmitted from each said signal port to the associated source, such that the actual TOA and the actual TOD of the signal packets or preceding and succeeding signal ports, in an operator selected sequence of said signal ports, are spaced at real time intervals substantially such that the length of a real time interval between the actual TOA and the acutal TOD of the signal packets of each said signal port is set in dependence on said source line frequency; and transferring the serial bits of each signal packet between each said signal port and the TSI matrix switch at a signal bit line frequency substantially equal to said clock frequency.

4. The method of claim 3, wherein the step of transferring comprises the steps of:

multiplexing the N number of signal packets received at said signal ports in each sample frame into M number of successive input segment signals corresponding in number to the M number of signal bits in the signal packets, each input segment signal comprising single bit samples from each of the N signal packets, said single bit samples arranged serially at said bit line frequency and successive ones of said N input segment signals occurring at a segment frequency substantially equal to the source line frequency and presenting said input segment signals in real time to the TSI matrix switch; and demultiplexing M number of output segment signals received from the TSI matrix switch in each sample period at said segment frequency and said bit line frequency, into N signal packets by presenting successive bits of each said output segment signal to successive ones of said signal ports at spaced real time intervals substantially equal said clock time period.

* * * * *